United States Patent [19]
Snyder et al.

[11] Patent Number: 5,695,272
[45] Date of Patent: Dec. 9, 1997

[54] SEARCH LIGHT FOR AIRCRAFT AND OTHER VEHICLES

[75] Inventors: Robert V. Snyder, Urbana; Jon C. Heisler, New Carlisle, both of Ohio

[73] Assignee: Grimes Aerospace Company, Urbana, Ohio

[21] Appl. No.: 601,462

[22] Filed: Feb. 14, 1996

Related U.S. Application Data

[63] Continuation of Ser. No. 250,170, May 27, 1994, abandoned.
[51] Int. Cl.$^6$ ............................................. F21V 9/00
[52] U.S. Cl. ................................... 362/231; 362/240
[58] Field of Search ........................... 362/6, 11, 16, 362/18, 240, 241, 231, 263, 294, 426, 800

[56] References Cited

U.S. PATENT DOCUMENTS

| | | | |
|---|---|---|---|
| 4,091,441 | 5/1978 | Ott | 362/231 |
| 4,677,533 | 6/1987 | McDermott | 362/240 |
| 4,947,291 | 8/1990 | McDermott | 362/231 |
| 5,060,118 | 10/1991 | Penrod | 362/231 |

*Primary Examiner*—James C. Yeung
*Attorney, Agent, or Firm*—Standley & Gilcrest

[57] ABSTRACT

A light assembly is described which includes connection to a mode switch capable of instantaneously switching the light source from a visible light source to an infrared light source and vice versa without the need for physically changing filters or lamp heads. The light may include a redundant system of multiple visible light filaments and infrared light filaments.

1 Claim, 4 Drawing Sheets

SEARCH LIGHT FOR AIRCRAFT AND OTHER VEHICLES

This application is a file wrapper continuation of application Ser. No. 08/250,170 filed May 27, 1994 now abandoned.

BACKGROUND AND SUMMARY OF THE INVENTION

The present invention relates generally to the art of lighting devices, and, more particularly relates to a search light that may be used on aircraft or other vehicles for landing, taxi mode, or search operations.

Vehicles, such as aircraft, generally have lights mounted thereon for providing illumination during take-off, landing, and search operations, when visibility is reduced by darkness or adverse weather conditions. These lights may be pivotable by drive means from a retract position to an extended position that provides optimum illumination during such times as take-off and landing. The lights may pivot to an additional extended position that provides optimum illumination for taxiing. The light may also rotate up to 360 degrees in the plane perpendicular to the extend-retract plane.

The military has found extensive use for infrared light sources for strategic military operations involving vehicles such as aircraft. It is advantageous to provide a light source that may provide both visible and infrared light albeit at separate times. Prior to the present invention, light sources were rotated from a light head having a visible light face 180 degrees opposite an infrared light face. In other words, only one face was in a forward looking position at any one time. Alternatively, filters have been placed over a visible light to make it an infrared light source. These two methods of providing both visible and infrared light sources for a vehicle suffer from the drawbacks of either having to have two light head faces or having to physically place a filter over a light source to make it infrared. The present invention is designed to overcome these deficiencies by providing a single light head face that is both a visible light source and an infrared light source without the need for physically installing and removing filters on the light head face in the field. Another advantage of the present invention is the ability to instantaneously change from a visible light source to an infrared light source without having to move the light head.

Light sources on vehicles have routinely failed due to normal wear and tear and life expectancy of the filaments within the light source. The present invention provides a redundant light source by providing a plurality of visible light source filaments and infrared light source filaments so that if any one light source filament stops functioning, the light source is still able to provide both visible or infrared light.

The present invention comprises a unique circuitry which enables a light source to be switched from visible light to infrared light by simply flipping a switch. In one preferred embodiment of the present invention, three separate visible light filaments and two infrared light filaments are secured within one lamp housing, each filament having its own parabolic reflector, thereby providing a redundant light source in the event any one filament ceases to function. The invention will be further described in view of the following detailed description of a preferred embodiment and the enclosed drawings.

DESCRIPTION OF PREFERRED EMBODIMENT(S)

Figure 1:
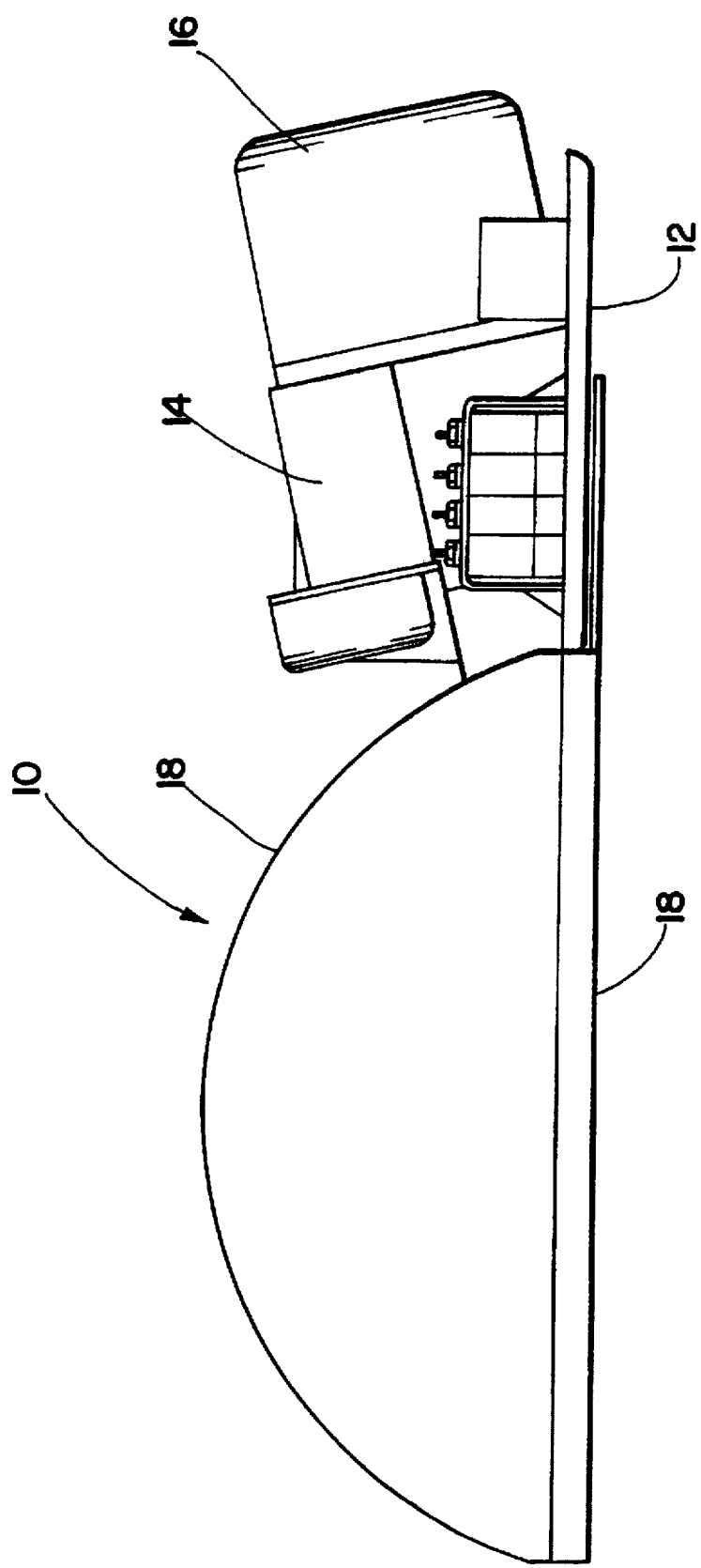
FIG. 1 is a side elevation view of one embodiment of the light source assembly of the present invention.
Figure 2:
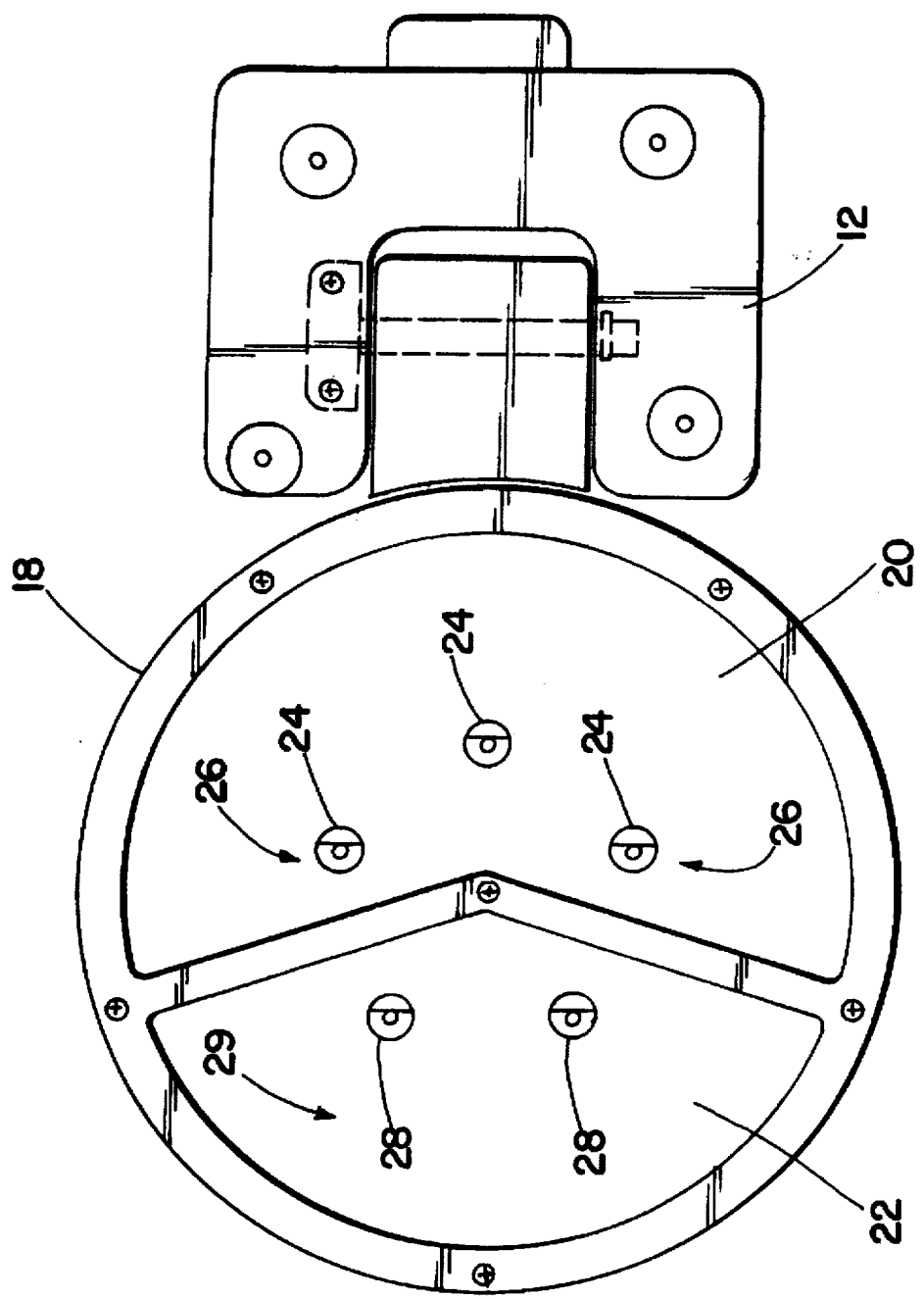
FIG. 2 is a plan view looking into the light source face of the embodiment shown in FIG. 1.

In one preferred embodiment of the present invention, the light 10 includes a base 12 for mounting to a vehicle, such as an aircraft. For example, the base 12 may be mounted to the fuselage of an airplane, the belly of a helicopter, or other selected surface. The base houses control circuitry 14 and drive means 16. A lamp head 18, substantially enclosing the lamps is pivotally mounted to the base 12 as shown in FIGS. 1 and 2. The lamp head 18 is connected to the drive means 16 such that the drive means may extend, retract, rotate right, and rotate left the lamp head over a range of operational positions.

FIG. 2 reveals one embodiment of the present invention in which redundant light sources are provided within one lamp head face. The internal portion of the lamp head face 18 may be segmented into two sections 20, 22. A visible light section 20 may have a plurality of visible light filaments 24, each preferably having their own respective reflector 26 associated therewith. In FIG. 2, a total of three visible light filaments are shown which may all be operational simultaneously. In the second section 22 of the lamp head 18, a plurality of infrared light filaments 28 may be secured preferably along with their own respective reflectors 29. Once again, all of the infrared light filaments may be operational simultaneously. If any one of the visible or infrared filaments would not function properly, at least one additional filament of that type of light source would likely still be operational.

Figure 3:
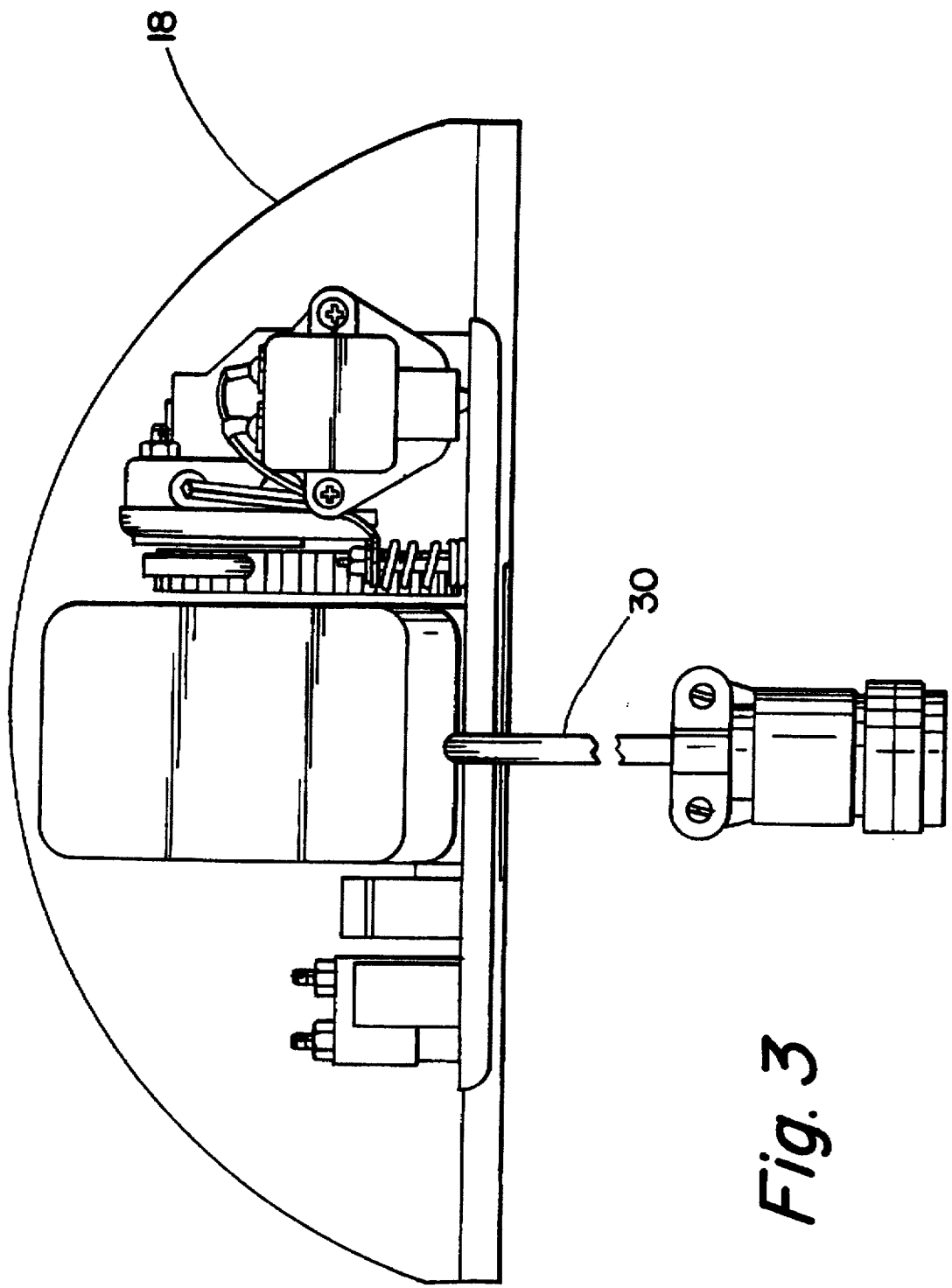
FIG. 3 is a rear elevation view of the light assembly as shown in FIG. 1.
Figure 4:
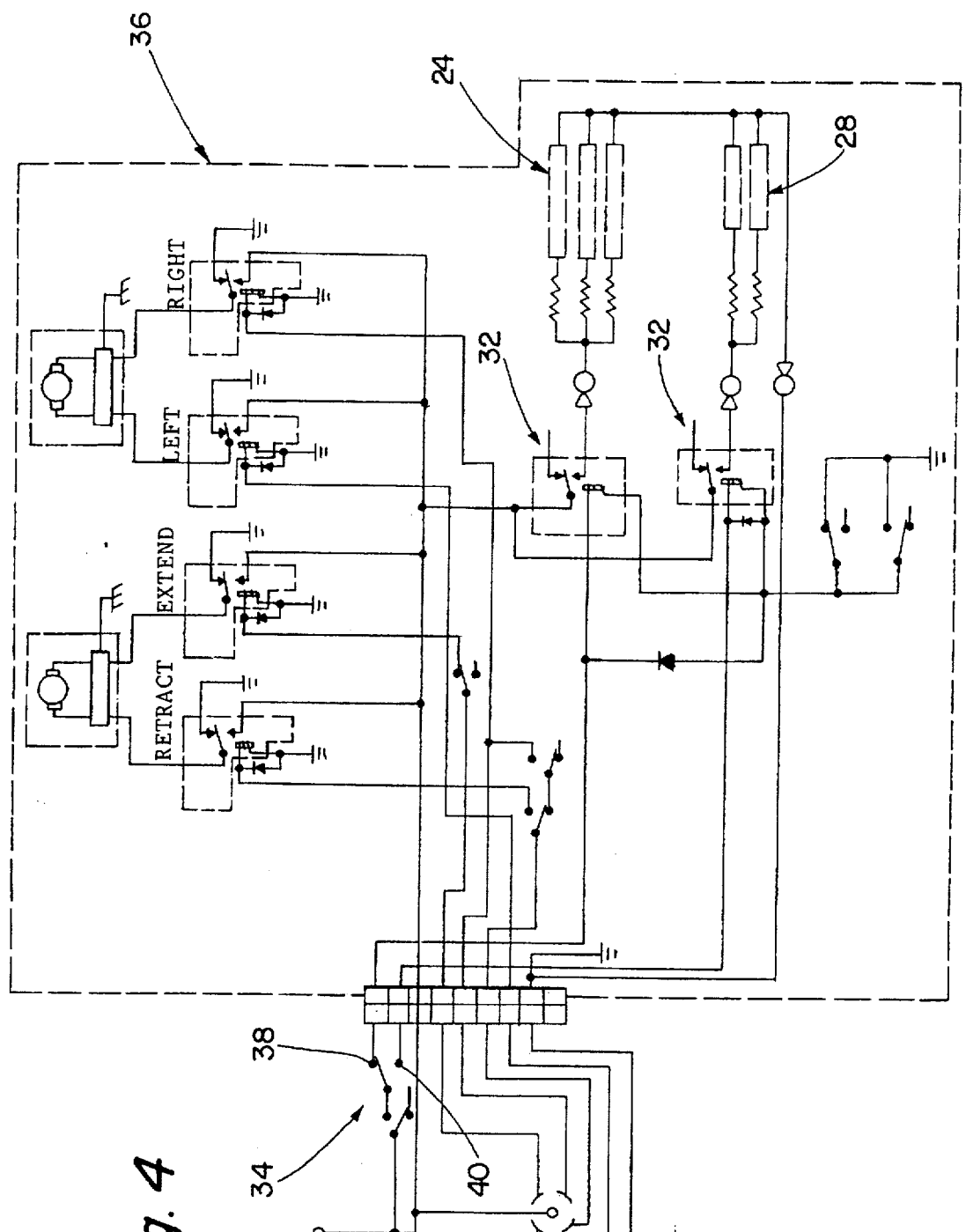
FIG. 4 is a preferred embodiment of an electrical circuit diagram of the light of the present invention.

FIGS. 3 and 4 show the physical connection 30 between the lamp head 18 and the operator's switch controls in the vehicle's cabin. Instantaneous mode changing may occur from a visible light mode to an infrared light mode and vice versa. This unique feature of the present invention is accomplished through the use of relays 32, and a mode selector switch 34 located in the operator's compartment. In FIG. 4, the circuit 36 is revealed for each of three visible light filaments 24 and two infrared light filaments 28. The circuit enables the lamp head to be extended, retracted, rotated right or left, and enables the instantaneous mode switching. By simply flipping the switch from one position 38 representing a visible light source to a second position 40 for an infrared light source the operator may instantaneously switch the operating mode of the lamp head. Either the visible light filaments are powered or the infrared light filaments are powered or the unit is off.

Although a particular embodiment of the present invention has been described herein, the present invention is not limited to the embodiment shown but is capable of being modified by one of ordinary skill in the art to a similar embodiment that would remain within the scope of the following claims.

What is claimed is:

1. A light assembly, comprising:

a lamp head having a visible light section and an infrared light section, both within a single lamp face, with said visible light section being physically divided from said infrared light section;

a first visible light filament secured within said visible light section of said lamp head;

a second visible light filament secured within said visible light section of said lamp head;

a first infrared light filament secured within said infrared light section of said lamp head;

a second infrared light filament secured within said infrared light section of said lamp head; and a mode switch electrically connected to said lamp head whereby power is supplied to said first and second visible light filaments or, power is supplied to said first and second infrared light filaments or, power is off to said visible light filaments and to said infrared light filaments, and whereby power may be instantaneously switched from said visible light filaments to said infrared light filaments.

* * * * *